(12) United States Patent
Eberle et al.

(10) Patent No.: US 6,840,587 B2
(45) Date of Patent: Jan. 11, 2005

(54) VEHICLE BRAKE SYSTEM HAVING AN ELECTRONIC UNIT FOR DETERMINING A VEHICLE REFERENCE SPEED

(75) Inventors: Wolfgang Eberle, Garching (DE); Reinhold Mayer, Karlsfeld (DE)

(73) Assignee: Knorr-Bremse Systeme für Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 10/087,906

(22) Filed: Mar. 5, 2002

(65) Prior Publication Data

US 2002/0158507 A1 Oct. 31, 2002

(30) Foreign Application Priority Data

Mar. 5, 2001 (DE) .......................................... 101 10 548

(51) Int. Cl.$^7$ ................................................ B60T 8/34
(52) U.S. Cl. ........................... 303/131; 303/7; 303/3; 303/166; 303/173
(58) Field of Search ......................... 303/7, 128, 131, 303/132, 135, 147, 166, 167, 168, 169, 171, 172, 173

(56) References Cited

U.S. PATENT DOCUMENTS

| | | | |
|---|---|---|---|
| 4,969,101 A | | 11/1990 | Matsuda |
| 5,015,042 A | * | 5/1991 | Yoshino ..................... 303/170 |
| 5,299,131 A | | 3/1994 | Haas et al. |
| 5,456,641 A | * | 10/1995 | Sawase ........................ 475/86 |
| 5,476,311 A | | 12/1995 | Fennel et al. |
| 5,729,476 A | | 3/1998 | Pfau |
| 5,791,744 A | | 8/1998 | Wood et al. |
| 5,944,393 A | * | 8/1999 | Sano ........................ 303/146 |
| 5,992,951 A | * | 11/1999 | Naito et al. .................. 303/171 |
| 6,026,343 A | * | 2/2000 | Ogino ........................... 701/72 |
| 6,112,146 A | * | 8/2000 | Mueller ........................ 701/71 |
| 6,142,587 A | * | 11/2000 | Ohtsu et al. ................. 303/167 |
| 6,163,742 A | | 12/2000 | Shimizu |
| 6,246,946 B1 | * | 6/2001 | Ohtsu ........................... 701/71 |

FOREIGN PATENT DOCUMENTS

| | | |
|---|---|---|
| DE | 34 41 103 A1 | 5/1986 |
| DE | 37 38 914 A1 | 5/1989 |
| DE | 39 25 829 A1 | 2/1991 |
| DE | 39 31 313 A1 | 3/1991 |
| DE | 44 44 408 A1 | 6/1996 |
| DE | 198 26 131 A1 | 12/1999 |
| DE | 199 30 561 A1 | 1/2000 |
| DE | 199 53 865 A1 | 5/2000 |
| DE | 100 26 685 A1 | 12/2001 |
| EP | 0 276 818 A2 | 1/1988 |
| JP | 361155049 | * 7/1986 |
| JP | 01275253 | * 11/1989 |
| JP | 403061154 | * 3/1991 |
| JP | 403197263 | * 8/1991 |
| JP | 404173462 | * 6/1992 |
| JP | 06144187 | * 5/1994 |
| JP | 408188139 | * 7/1996 |
| JP | 409193777 | * 7/1997 |

\* cited by examiner

*Primary Examiner*—Robert A. Siconolfi
*Assistant Examiner*—Devon Kramer
(74) *Attorney, Agent, or Firm*—Barnes & Thornburg LLP

(57) ABSTRACT

For determining a reference speed which is approximated to the actual vehicle speed, at least two wheel sensors are provided for each wheel speed to be measured. All existing wheel sensors are analyzed, and only one is selected and used for determining the reference speed as a function of the actual driving condition and of at least one defined speed criterion. At least one sensor is always available for controlling each wheel, even if one sensor is faulty.

16 Claims, 4 Drawing Sheets

VEHICLE BRAKE SYSTEM HAVING AN ELECTRONIC UNIT FOR DETERMINING A VEHICLE REFERENCE SPEED

BACKGROUND AND SUMMARY OF THE INVENTION

The present invention relates to a vehicle brake system and, more specifically, to vehicle speed determination portion.

Modern road and rail vehicles are normally equipped with an antilock system which, in the case of road vehicles, is called an "ABS system," and, in the case of rail vehicles, is called a "nonskid system." ABS systems and nonskid systems have the purpose of controlling the brake pressures at individual wheels or axles of the vehicle such that a locking of the wheels or wheel sets is prevented, and the braking distance is minimized. For this type of a brake pressure control, the amount of slip at the individual wheels or axles are required which are determined from the respective wheel speeds and the actual vehicle speed. For this purpose, rotational wheel speed sensors are normally required, and an approximated value for the actual vehicle speed is computed from the individual rotational wheel speeds. This value will be called the "reference speed" in the following.

Particularly in the case of poor coefficients of adhesion between the wheel and the roadway/track, the reference speed significantly influences the brake power control at the wheels. A "false" reference speed can, therefore, result in errors in the brake power control of the entire vehicle. Thus, for a good ABS or nonskid system control, a determination of the actual vehicle speed, that is, of the reference speed, is required which is as exact as possible. Particularly in the case of vehicles which only have a single independent system for the brake power control, in the event of a reduced coefficient of adhesion between the wheel and the rail, a protection must be ensured against individual errors.

From German Patent Document DE 39 31 313 A1, an antilock system for a motorcycle is known in which one rotational speed sensor respectively is assigned to the front wheel and the rear wheel. For determining the wheel slips, a reference speed which approximates the actual vehicle speed is determined for the front wheel and the rear wheel respectively.

The ABS and nonskid systems each conventionally have a single-channel construction, that is, the rotational wheel speed is sensed for each wheel or wheel group respectively by a single rotational wheel speed sensor. When a pulse generator, that is, a rotational wheel speed sensor fails, the assigned wheel or wheels is/are "unprotected," that is, they can no longer be controlled corresponding to the rotational wheel speed.

If a defective rotational wheel speed sensor supplies a "false" wheel speed which is used to determine the reference speed, there is the risk that the brake pressure is erroneously reduced on all axles or that the traction is regulated in a faulty manner or is regulated down on all axles.

So that faulty rotational wheel speed signals, if possible, will not falsify the reference speed value, algorithms for computing the reference speed known from prior art originating from the applicant have a "detection" of faulty signals, but a reliable detection of all possible faults requires very high expenditures. In addition, already during the "fault disclosure time," faults can have such an effect on the computation of the reference speed that the brake power control is disadvantageously affected.

It is an object of the invention to provide a brake system which is optimized with respect to the determination of the actual vehicle or reference speed and, also in the event of a sensor, leaves no wheel unprotected. This object is achieved by the present system.

In the case of a brake system having an electronic brake unit and rotational wheel speed sensors connected thereto, the basic principle of the invention consists of assigning to each wheel to be monitored and to each wheel group to be monitored at least two wheel sensors respectively. During the operation, all wheel sensors present in the vehicle are constantly monitored. However, the reference speed approximating the actual vehicle speed is determined at any point in time using only one of the rotational wheel speed signals sensed by the wheel sensors. Which of the existing rotational wheel speed sensors should instantaneously be selected and considered decisive for the reference speed is determined according to the invention as a function of the actual driving condition and at least one defined speed criterion. The invention, therefore, provides an ABS or nonskid system with a fault tolerance against a failure of a speed sensor.

In simplified terms, the system examines whether the vehicle is just being braked or accelerated or is coasting without being driven. As a function of the present driving condition, one of the "higher" measured or of the "lower" measured wheel speeds is used as the basis for determining the reference speed, which will be explained in greater detail.

According to a further development of the invention, in the case of a braked vehicle, the reference speed is determined according to the second-highest wheel speed. As an alternative, it can also be provided that, in the case of a braked vehicle, the minimum speed is determined first from each "rotational speed pair" of the mutually assigned rotational wheel speed sensors. The reference speed will then be determined according to the instantaneous maximum of these minimum speeds.

In the case of an unbraked vehicle, particularly in the case of a driven vehicle (traction), the reference speed can be determined according to the second-lowest wheel speed. As an alternative, it can be provided that, in the case of an unbraked vehicle, the maximum speed is first determined from each rotational speed pair, and that the reference speed will then be determined according to the minimum of these maximum speeds.

It is, therefore, ensured during the braking that a disturbance-caused excessive speed signal does not influence the reference speed. Correspondingly, in the case of an unbraked vehicle or in the "traction" condition, a disturbance-caused wheel speed signal which is too low is "blinded out" or filtered out.

The detection of the rotational wheel speed signals can take place either by a single control unit or, as an alternative, can be distributed on several control units when, for example, the number of available inputs of a control unit is not sufficient. In the case of a distribution on several control units, the wheel speed signals are mutually exchanged between the control units by a data bus.

Since, according to the invention, two rotational wheel speed sensors are assigned to a wheel or a wheel group respectively, it must also be determined which of the two rotational wheel speed sensors is to be decisive for the brake power control, that is, the ABS or nonskid system respectively and the ASR control at the respective wheel or the respective wheel group. First, when considering the ABS and nonskid control respectively, the following may be provided:

a) The ABS and nonskid control, respectively, are based on the higher wheel speed of the wheel speeds supplied by the mutually assigned wheel sensors, specifically when, in a driving condition, the "protection against an erroneous releasing of the brake" has the highest priority, for example, in the case of a single-driving vehicle; or b) the ABS or nonskid control, respectively, is based on the lower wheel speed of the two wheel speeds when "the antilock protection" has the highest priority, for example, in the case of a train consisting of several cars.

With respect to the wheel slip control system (ASR or antislip control) of a wheel, the following can be provided:

a) The ASR control is based on the lower of the two wheel speeds when the "protection against an erroneous reduction of the traction force" has the highest priority; or b) the ASR control is based on the higher of the two wheel speeds when the spin of a wheel is to be prevented with the highest priority.

According to a further development of the invention, all rotational wheel speed signals are subjected to a plausibility check by an electronic monitoring unit. When a fault is detected for a rotational wheel speed signal or when a rotational wheel speed signal is considered implausible, which can be caused, for example, by a sensor failure or by sensor signal peaks because of external electromagnetic interference fields, after a corresponding "fault disclosure time" (time duration until the fault is detected), this rotational wheel speed signal is no longer included in the determination of the reference speed and also no longer into the controlling of the braking or driving force of the assigned wheel or wheel group. In such a case, only the second "channel," that is, the other assigned rotational wheel speed sensor, is still analyzed.

The invention is, therefore, based on the assumption that not the electronic unit but the "periphery," that is, particularly the sensor system, represents the main fault source. The reason is that sensors fail considerably more frequently than the electronic brake unit itself. In contrast to the abovementioned German Patent Document DE 39 31 313 A1, the invention moves away from the "idea of the dual-channel characteristic of the reference speed," according to which an "own" reference speed is defined for individual wheel and wheel groups respectively.

On the contrary, according to the invention, a "double," that is, truly redundant, rotational speed detection is provided. An individual fault of a sensor, therefore, does not affect the entire brake control of the vehicle because, in addition to the faulty speed information, an intact speed information of the "affected" wheel or of the concerned wheel group is still present.

A central point of the invention in this case is the above-described "selection logic." The selection logic permits a fast and simple decision as to which of the two mutually assigned sensors, for safety reasons or for availability reasons, supplies the "more precise or more realistic" signal. Thus, that sensor of a pair of sensors can be "separated out" very rapidly, that is, already during a fault recognition time, whose inclusion has an unfavorable effect on the control target; for example, whose inclusion into the reference speed would have a disadvantageous effect on the driving safety. An individual sensor cannot, therefore, influence the reference speed determination in such a manner that all or some of the vehicle brakes are erroneously "debraked."

In particular, the individual brake pressure control of the wheel affected by an individual fault of a sensor can, as a rule, be implemented to an unlimited extent. If the faulty sensor can be determined, after the expiration of the fault recognition time, the intact sensor is automatically used which is always available here to the logic for this wheel, so that no losses have to be accepted with respect to the controllability. Before the expiration of the fault recognition time or in the case of faults where it cannot be decided which of the two differing sensors is faulty, corresponding to the above-explained criteria, a decision is made either in favor of the driving safety or in favor of the availability. In the case of a decision in favor of the driving safety, that sensor is considered to be "valid" which indicates the lower wheel slip, that is the lower braking. In the case of a decision in favor of the availability, that sensor is considered to be "valid" which indicates the higher wheel slip, that is, which indicates a greater braking of the wheel or wheel group.

In comparison to conventional brake systems, in which in each case only one rotational speed sensor is provided for determining the wheel speeds, the reference speed determination according to the invention is based on a larger number of sensor signals, which improves the protection against faults or the detectability of faults.

The advantages of the invention can be summarized as follows:

1. An individual fault during the detection of the wheel speed will never affect the reference speed formation such that the braking force or a portion of the braking force of the vehicle or the driving force of the vehicle is completely reduced. This applies also when only one control unit is used.

2. The possibilities for detecting implausible rotational wheel speed signals are significantly improved because the number of detected rotational wheel speeds is large, and the speeds can be centrally compared with one another.

3. As a result of the redundant rotational speed detection, two rotational speed signals of a wheel can always be included in the control. The wheel, therefore, also remains protected when one of the two rotational speed signals fails.

4. The "2-channel characteristic" can be implemented in a cost-effective manner by using only one control computer. In contrast to a single-channel system, only double pulse generators or two individual rotational speed generators are required. The use of two control units is not absolutely necessary.

Other aspects of the present invention will become apparent from the following detailed description of the invention, when considered in conjunction with accompanying drawings.

DETAILED DESCRIPTION OF THE PREFERRED EMBODIMENTS

Figure 1:
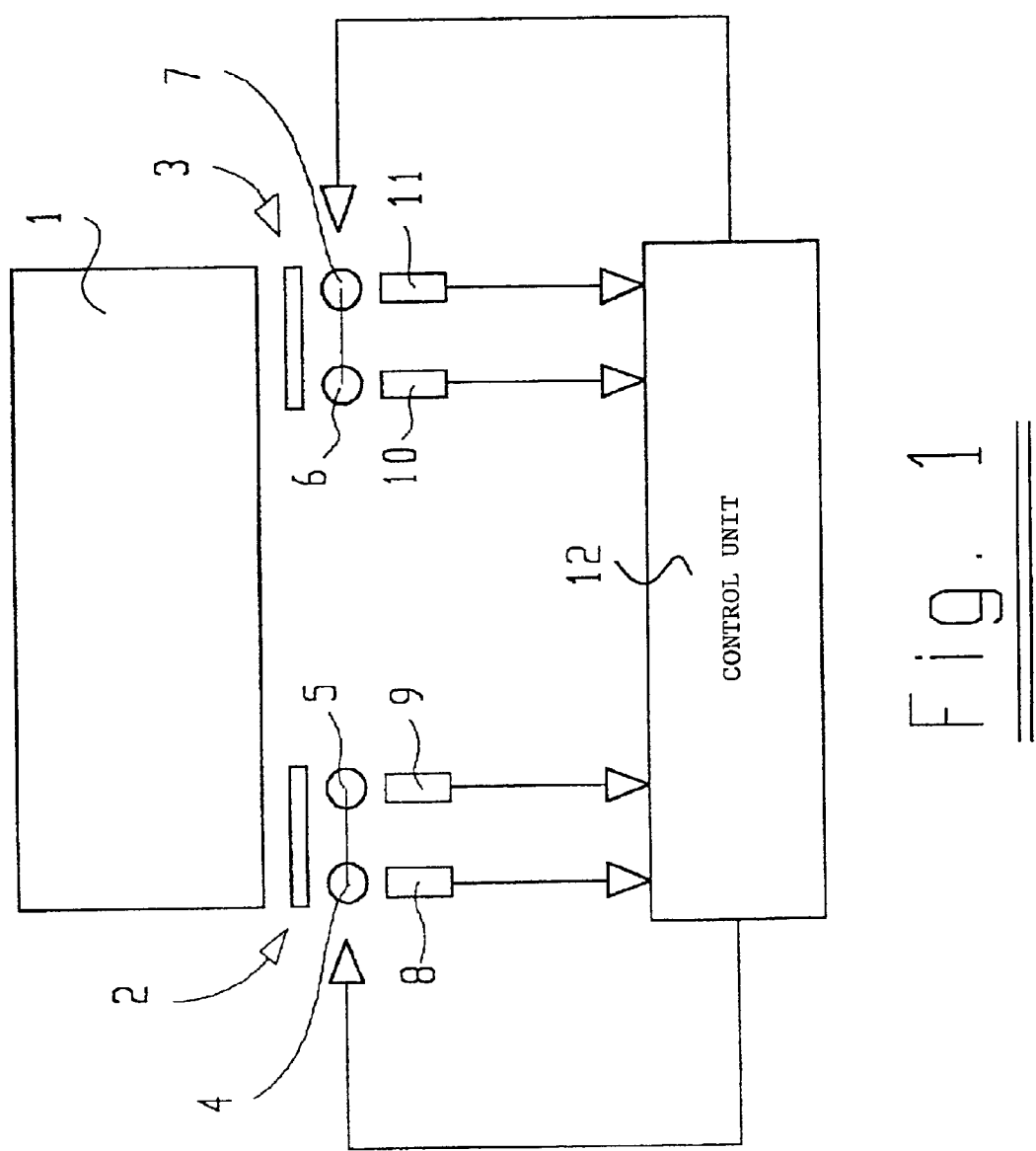
FIG. 1 is a schematic representation of a vehicle incorporating a brake system according to the principles of the present invention.

FIG. 1 illustrates a rail vehicle 1 having a first bogie 2 and a second bogie 3. The two vehicle axles 4, 5 are assigned to the first bogie 2, and the two vehicle axles 6, 7 are assigned to the second bogie 3. The wheel axle 4 is kinematically coupled with the wheel axle 5, which is indicated here only by a schematically illustrated connecting rod. The wheel axles 4, 5, therefore, have the same actual rotational wheel speed. The same applies to the wheel axles 6, 7. The wheel axles 4, 5, as well as the wheel axles 6, 7, therefore, each form a "wheel group" with the same actual wheel speed.

The wheel speeds of the wheel axles 4–7 are sensed by assigned rotational wheel speed sensors 8–11. The rotational wheel speed signals supplied by the rotational wheel speed sensors 8–11 are analyzed by a control unit 12, which correspondingly controls the brakes of the bogies 2 and 3.

In the case of a normal brake system, the rotational wheel speed sensors 8, 9 and 10, 11, respectively, would supply identical signals. However, as a result of sensor interferences or external interfering influences, such as electromagnetic interfering fields, the sensor pairs 8, 9 and 10, 11, respectively, may deviate from one another. As a function of the respective driving condition, that is, depending on whether the vehicle is braked or unbraked, by means of a speed criterion, a sensor which is to be considered valid can be selected from the sensor groups 8, 9 and 10, 11, respectively.

In the case of a braked vehicle, for example, the reference speed can be determined on the basis of the rotational wheel speed sensor 8–11 which has the second-highest wheel speed. As an alternative, from each of the two sensor pairs 8, 9 and 10, 11, respectively, the sensor with the minimal speed per pair can be selected. From the two minimal speed sensors, the maximal speed can then be selected for determining the reference speed (min-max selection).

In the case of an unbraked vehicle, the reference speed can be determined on the basis of the second-lowest wheel speed measured by the rotational wheel speed sensors 8–11. As an alternative, first a maximal selection can be made from the two rotational speed pairs. Finally, from the two maximal speeds, the lower one can be used for determining the reference speed (max-min selection).

The brake pressure control at the wheel axles 4–7 can take place corresponding to the above-explained safety or availability criteria.

Figure 2:
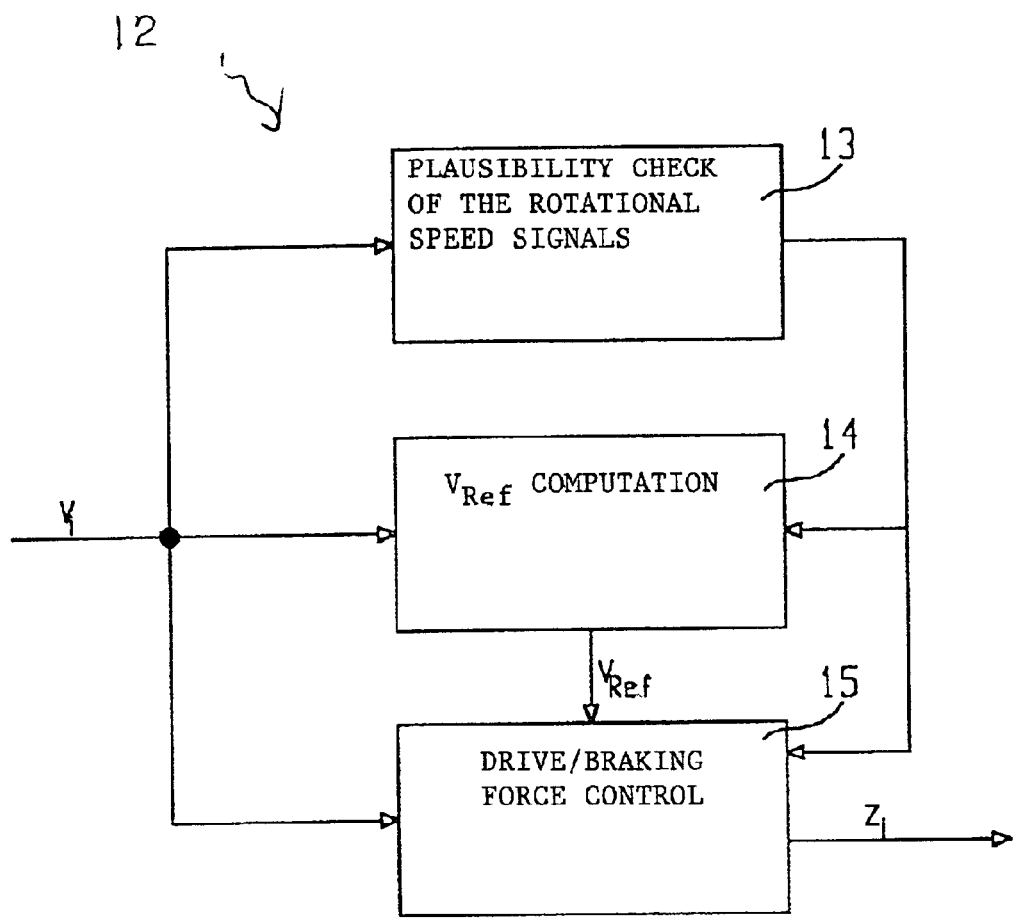
FIG. 2 is a simplified representation of the construction of the electronic brake unit according to the principles of the present invention.

FIG. 2 is a simplified view of the algorithms implemented in a control unit according to the invention. The measured rotational speed signals $v_1$ are fed to three blocks, specifically, a plausibility control 13, an algorithm 14 for computing the reference speed $v_{ref}$, as well as a control algorithm 15 for controlling the driving/braking force $z_i$ of an individual wheel or of a wheel group.

The plausibility algorithm 13 makes a "rough selection." In this case, it checks whether individual rotational wheel speed signals $v_1$ are not realistic at all and should, therefore, be separated out by providing signals to the reference speed algorithm 14 and control algorithm 15.

A reference speed $v_{ref}$ is formed from the rotational wheel speed signals according to the above-explained driving condition and speed criteria. In this case, the reference speed computation $v_{ref}$ is always "oriented" or determined according to a single rotational wheel speed signal. "Orienting" means that the reference speed is not necessarily set to be identical with the instantaneously decisive rotational wheel speed signal but that the rotational wheel speed signal enters the reference speed possibly in a filtered or smoothed manner in order to obtain a "smooth" speed course or one that is as realistic as possible and which is approximated to the actual vehicle speed as well as possible.

Taking into account the rotational wheel speed signals $v_i$ and the reference speed $v_{ref}$, the control algorithm 15 determines the wheel slips occurring at the individual wheels or wheel groups and, as a function thereof, controls the driving or braking forces by output signal $z_i$.

Figure 3:
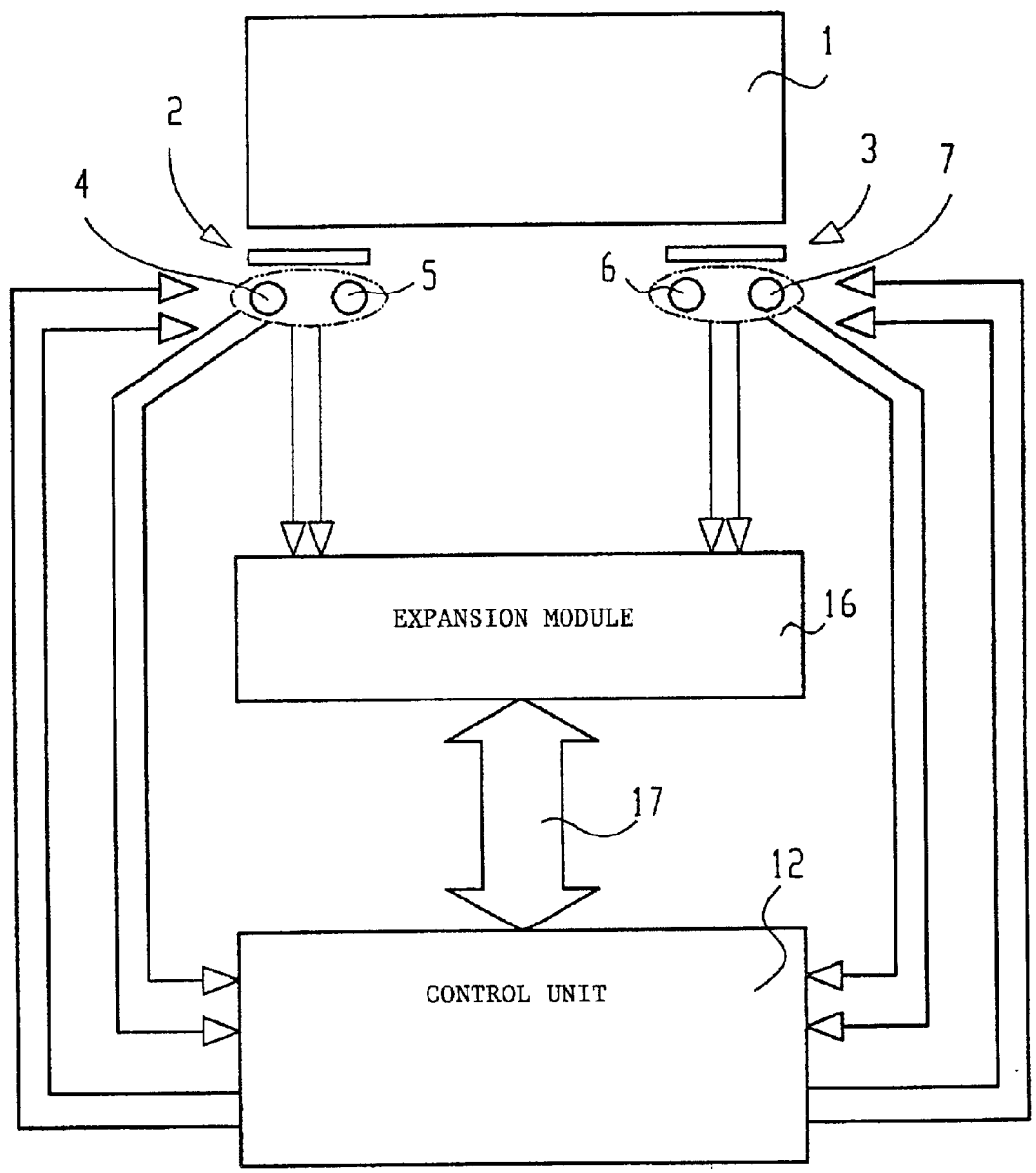
FIG. 3 is a view of an embodiment of a 4-axle vehicle with axles which are independent with respect to the rotational speed with a brake system according to the principles of the present invention.

FIG. 3 shows a schematic embodiment of the nonskid or antislip system of a 4-axle vehicle. In contrast to FIG. 1, the axles 4–7 are not mutually coupled with respect to the rotational speed. Each axle's speed is monitored by a pair of sensors. The rotational speed detection is distributed here to two "modules," specifically to the control unit 12 and to an expansion module 16 which are connected with one another by a data bus 17. This means a portion of the rotational wheel speed signals, for axles 4 and 7, for example, is fed directly to the control unit 12, and another portion of rotational wheel speed signals, for axles 5 and 6, for example, is fed to the expansion module 16. From the expansion module 16, the rotational wheel speed signals are sent to the control unit 12. However, the above-explained control algorithms are implemented in the control unit 12.

Figure 4:
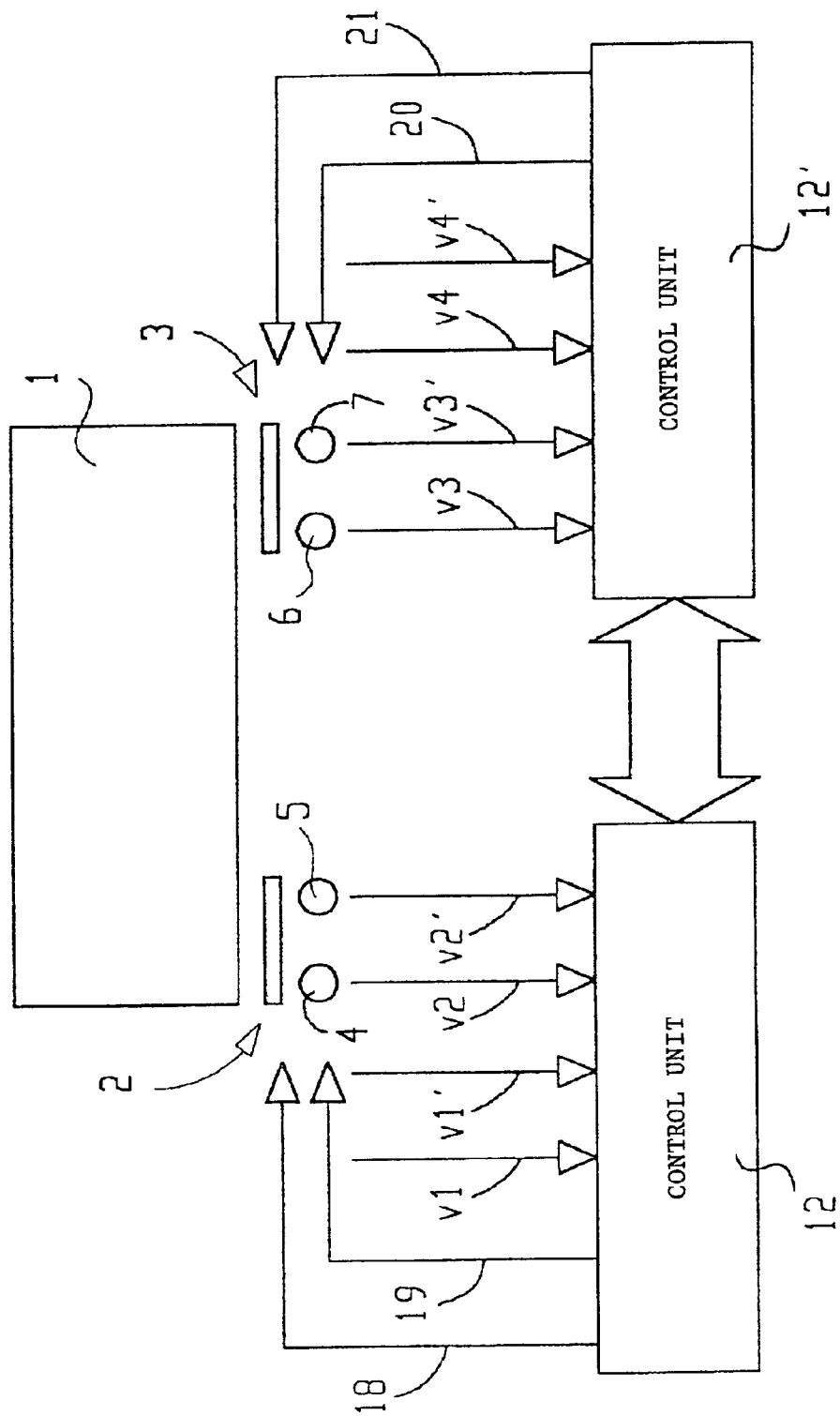
FIG. 4 is a view of another embodiment of a 4-axle vehicle with axles which are independent with respect to the rotational speed with a brake system according to the principles of the present invention.

FIG. 4 also shows an embodiment of a nonskid or antislip system for a 4-axle vehicle with independent axles. However, in contrast to FIG. 3, a separate control unit 12, 12' for the braking force control is assigned here to each of the two bogies 2 and 3. In control unit 12, rotational wheel speed signals $v_1$, $v_{1'}$, $v_2$, $v_{2'}$, are supplied, and in control unit 12', rotational wheel speed signals $v_3$, $v_{3'}$, $v_4$, $v_{4'}$ are supplied. Therefrom, brake control signals 18 to 21 for the axles 4 to 7 are computed by the control units 12, 12'.

Although the present invention has been described and illustrated in detail, it is to be clearly understood that this is done by way of illustration and example only and is not to be taken by way of limitation. The spirit and scope of the present invention are to be limited only by the terms of the appended claims.

What is claimed is:

1. A vehicle brake system comprising:
   at least two wheel speed sensors assigned to measure a speed of each wheel, the sensors either measuring a speed of each wheel or a single common speed of each wheel group whose speed is to be measured;
   an electronic unit for analyzing signals from the wheel sensors to instantaneously select the signals from one of the wheel sensors and determining a reference speed approximating the actual vehicle speed using the selected signals; and
   the electronic unit selecting the one wheel sensor as a function of the actual driving condition and at least one defined speed criterion.

2. The vehicle brake system according to claim 1, wherein there are only two wheel sensors provided for each wheel or wheel group whose speed is to be measured.

3. The vehicle brake system according to claim 1, wherein for a braked vehicle, the wheel sensor which indicates the second-highest wheel speed is selected.

4. The vehicle brake system according to claim 1, wherein for an unbraked vehicle, the wheel sensor which indicates the second-lowest wheel speed is selected.

5. The vehicle brake system according to claim 1, wherein one sensor for each wheel or group of wheels is initially selected using a first speed criterion; and one of the initially selected sensors is finally selected, using a second speed criterion, and used to determine the reference speed.

6. The vehicle brake system according to claim 5, characterized in that the first and the second speed criterion are in each case an extreme-value criterion.

7. The vehicle brake system according to claim 5, wherein for a braked vehicle, the wheel sensor with the minimal wheel speed is initially selected from the respectively at least two wheel sensors assigned to each wheel or wheel group; and the initially selected sensor having the maximal speed is finally selected.

8. The vehicle brake system according to claim 5, wherein for an unbraked vehicle, the wheel sensor with the maximal wheel speed is initially selected from the respectively at least two wheel sensors assigned to each wheel or wheel group; and the initially selected sensor having the minimal speed is finally selected.

9. The vehicle brake system according to claim 1, wherein the electronic unit is an ABS/ASR control unit.

10. The vehicle brake system according to claim 9, wherein for an ABS control intervention of the brake pressure control of a wheel or of a wheel group, a higher speed of the speeds supplied by the at least two assigned wheel sensors is used as a basis when a protection against an erroneous reduction of the brake force has the highest priority.

11. The vehicle brake system according to claim 9, wherein for an ABS control intervention of the brake pressure control of a wheel or of a wheel group, a lower speed of the speeds supplied by the at least two assigned wheel sensors is used as a basis when a protection against a locking of the wheel or of the wheel group has the highest priority.

12. The vehicle brake system according to claim 9, wherein for an ASR control intervention of the brake pressure control of a wheel or of a wheel group, a lower speed of the speeds supplied by the at least two assigned wheel sensors is used as a basis when a protection against an erroneous reduction of the traction force at the wheel or the wheel group has the highest priority.

13. The vehicle brake system according to claim 9, wherein for an ASR control intervention of the brake pressure control of a wheel or of a wheel group, a higher speed of the speeds supplied by the at least two assigned wheel sensors is used as a basis when a protection against a spinning of a wheel or of the wheel group has the highest priority.

14. The vehicle brake system according to claim 1, including a plausibility checking device which subjects the signals supplied by the wheel speed sensors to a plausibility check; and wherein the electronic unit does not consider sensors which supply signals that do not pass the plausibility check.

15. The vehicle brake system according to claim 1, wherein for a braked vehicle, the wheel sensor with the minimal wheel speed is initially selected from the respectively at least two wheel sensors assigned to each wheel or wheel group; and the initially selected sensor having the maximal speed is finally selected.

16. The vehicle brake system according to claim 1, wherein for an unbraked vehicle, the wheel sensor with the maximal wheel speed is initially selected from the respectively at least two wheel sensors assigned to each wheel or wheel group; and the initially selected sensor having the minimal speed is finally selected.

* * * * *